(12) United States Patent
Sato

(10) Patent No.: US 12,105,034 B2
(45) Date of Patent: *Oct. 1, 2024

(54) SINGLE-CRYSTAL X-RAY STRUCTURE ANALYSIS APPARATUS, AND METHOD THEREFOR

(71) Applicant: Rigaku Corporation, Tokyo (JP)

(72) Inventor: Takashi Sato, Tokyo (JP)

(73) Assignee: Rigaku Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/448,939

(22) Filed: Aug. 13, 2023

(65) Prior Publication Data

US 2024/0019385 A1 Jan. 18, 2024

Related U.S. Application Data

(62) Division of application No. 17/295,859, filed as application No. PCT/JP2019/045691 on Nov. 21, 2019, now Pat. No. 11,874,204.

(51) Int. Cl.
| | | |
|---|---|---|
| *G01N 23/20025* | (2018.01) | |
| *G01N 1/28* | (2006.01) | |
| *G01N 23/207* | (2018.01) | |

(52) U.S. Cl.
CPC ............. *G01N 23/207* (2013.01); *G01N 1/28* (2013.01); *G01N 23/20025* (2013.01)

(58) Field of Classification Search
CPC ............... G01N 23/20025; G01N 1/28; G01N 23/20016; G01N 23/207; G01N 2223/309
See application file for complete search history.

(56) References Cited

U.S. PATENT DOCUMENTS

| 6,918,698 B2 | 7/2005 | Nordmeyer et al. |
| 7,274,769 B2 | 9/2007 | Nordmeyer et al. |
| (Continued) | | |

FOREIGN PATENT DOCUMENTS

| EP | 2 126 553 B1 | 2/2009 |
| JP | H06-194276 A | 7/1994 |
| (Continued) | | |

OTHER PUBLICATIONS

CN Office Action issued in CN Application No. 201980088767.5, The State Intellectual Property Office of People's Republic of China, People's Republic of China, Dec. 27, 2023, 19 pages.

(Continued)

*Primary Examiner* — David P Porta
*Assistant Examiner* — Mamadou Faye
(74) *Attorney, Agent, or Firm* — ASLAN LAW, P.C.

(57) ABSTRACT

A user-friendly single-crystal X-ray structure analysis apparatus for quickly performing a single-crystal X-ray structure analysis using a crystalline sponge and easily making it possible by including managing related information and a method therefor, are provided. There are provided a sample holder comprising a porous complex crystal capable of soaking a sample in a plurality of fine pores formed therein; a goniometer that rotationally moves, the sample holder being attached to the goniometer; an information acquisition section 600 that acquires invariable information about the porous complex crystal or variable information provided after the sample is soaked therein; and an information storage section 111 that stores the invariable information or the variable information acquired by the information acquisition section 600.

6 Claims, 11 Drawing Sheets

(56) References Cited

U.S. PATENT DOCUMENTS

| | | | |
|---|---|---|---|
| 7,443,952 | B2 | 10/2008 | Dosho et al. |
| 7,696,991 | B2 | 4/2010 | Higashi |
| 10,190,952 | B2 | 1/2019 | Fujita et al. |
| 10,684,198 | B2 | 6/2020 | Fujita et al. |
| 11,874,204 | B2* | 1/2024 | Sato ................ G01N 23/20025 |
| 2003/0152194 | A1 | 8/2003 | Nordmeyer et al. |
| 2005/0163280 | A1 | 7/2005 | Nordmeyer et al. |
| 2006/0029184 | A1* | 2/2006 | Lin ...................... G01N 23/207 378/73 |
| 2007/0005268 | A1 | 1/2007 | Higashi |
| 2007/0228049 | A1 | 10/2007 | Nordmeyer et al. |
| 2008/0084964 | A1 | 4/2008 | Dosho et al. |
| 2011/0196025 | A1* | 8/2011 | Kostik .................. C07C 327/56 564/74 |
| 2012/0270167 | A1 | 10/2012 | Sato et al. |
| 2015/0219533 | A1 | 8/2015 | Kitamoto et al. |
| 2017/0219500 | A1 | 8/2017 | Fujita et al. |
| 2019/0137367 | A1 | 5/2019 | Fujita et al. |
| 2020/0225175 | A1 | 7/2020 | Kagatsume et al. |

FOREIGN PATENT DOCUMENTS

| | | | |
|---|---|---|---|
| JP | H11-304999 | A | 11/1999 |
| JP | 2003-083412 | A | 3/2003 |
| JP | 2007-003394 | A | 1/2007 |
| JP | 2013-156218 | A | 8/2013 |
| JP | WO 2014/038220 | A1 | 3/2014 |
| JP | 2014-130063 | A | 7/2014 |
| JP | WO 2016/017770 | A1 | 7/2017 |
| JP | 2018-155680 | A | 10/2018 |
| WO | WO 2011/115223 | A1 | 9/2011 |
| WO | WO 2015/132909 | A1 | 9/2015 |
| WO | WO 2018/198589 | A1 | 11/2018 |

OTHER PUBLICATIONS

JP Office Action issued in JP Application No. 2023-060097, JPO, Japan, Jan. 30, 2024, 3 pages.

CN Office Action issued in CN Application No. 201980088745.9, The State Intellectual Property Office of People's Republic of China, People's Republic of China, Nov. 28, 2023, 8 pages.

Japan Patent Office (JPO), JP Office Action issued in JP Application No. 2020-557646, Japan, Oct. 18, 2022, 3 pages.

US Office Action issued in U.S. Appl. No. 17/295,858, USPTO, USA, Apr. 12, 2023, 21 pages.

International Search Report issued in PCT Application No. PCT/JP2019/045690, JPO, Japan, Feb. 10, 2020, 3 pages.

EP Partical Search Report issued in EP Application No. 19 887 839.9, Sep. 8, 2022, EPO, Germany, 12 pages.

International Search Report issued in PCT Application No. PCT/JP2019/045691, JPO, Japan, 3 pages, Feb. 18, 2020.

US Notice of Allowance issued in U.S. Appl. No. 17/295,858, USPTO, U.S.A., Aug. 16, 2023, 40 pages.

US Notice of Allowance issued in U.S. Appl. No. 17/295,859, USPTO, U.S.A., Aug. 16, 2023, 38 pages.

Yasuhide Inokuma , Makoto Fujita et al; "X-ray analysis on the nanogram to microgram scale using porous complexes"; Nature 495, 461-466; Mar. 28, 2013.

Hoshino et al., "The crystalline sponge method updated", IUCrJ, (2016), 3, 139-151.

Yasuhide Inokuma, "'Crystal sponge' method overturns common sense of crystal structure analysis", Chemistry, vol. 68, No. 8, pp. 35-40, in particular, p. 39, fig.5, non-officieal translataion, Aug. 1, 2013.

Inokuma, Yasuhide et al., "X-ray crystallography of extremely small amount of compounds by crystal sponge method", Farumashia , 2014, vol. 50, No. 8, pp. 756-761, column "5. Application of crystal sponge method", fig. 4, non-official translation.

U.S. Office Action, U.S. Appl. No. 17/295,859, USPTO, USA, Mar. 31, 2023, 40 pages.

EP Search Report issued in EP Application No. 19 886 376.3, European Patent Office, Munich Germany, Jul. 8, 2022, 9 pages.

EP Search Report issued in EP Application No. 19 887 839.9, EPO, Germany, Dec. 8, 2022, 12 pages.

JP Office Action issued in JP Application No. 2020-557645, JPO, Japan, Oct. 18, 2022, 4 pages.

CN Office Action issued in CN Application No. 201980088745.9, The State Intellectual Property Office of People's Republic of China, People's Republic of China, May 28, 2024, 11 pages.

CN Office action issued in CN 201980088767.5, China National Intellectual Property Administration, People's Republic of China, Jun. 29, 2024, 20 pages.

EP Office action issued in EP19 886 376.3, EPO, Germany, Jul. 16, 2024, 5 pages.

* cited by examiner

SINGLE-CRYSTAL X-RAY STRUCTURE ANALYSIS APPARATUS, AND METHOD THEREFOR

CROSS-REFERENCE TO RELATED APPLICATIONS

This application is a Divisional of co-pending U.S. application Ser. No. 17/295,859 filed on May 20, 2021, and U.S. application Ser. No. 17/295,859 claims priority to JP Patent Application No. 2018-218733 filed on Nov. 22, 2018, and U.S. application Ser. No. 17/295,859 claims priority to and is a 371 of international PCT Application No. PCT/JP2019/045691 filed on Nov. 21, 2019. The entire contents of each of the above-identified applications are hereby incorporated by reference in their entirety.

TECHNICAL FIELD

The present invention relates to a next-generation single-crystal X-ray structure analysis apparatus capable of analyzing a structure of a material by an aggregative microstructure such as its atomic or molecular arrangement; and relates specifically to a single-crystal X-ray structure analysis apparatus that enables a high-yield, efficient, very versatile and user-friendly operation and to a method therefor.

BACKGROUND ART

In research and development for new devices and materials, the materials are ordinarily synthesized and evaluated to determine the next research policy based on the foregoing. In a structure analysis of a material using X-ray diffraction for performing material development in a short period of time, a search method of a material structure centering on the material structure analysis capable of efficiently performing the structure analysis, and an X-ray structure analysis used therein are indispensable for efficiently searching the material structure that realizes the function/physical property of an object material.

However, it has been difficult for those other than X-ray specialists to perform the structure analysis based on the results obtained by the foregoing method. Therefore, an X-ray structure analysis system with which the structure analysis can be performed by anyone who is not even a specialist of X-rays has been demanded. In this regard, as is known from the following Patent Document 1, the single-crystal X-ray structure analysis has gained attention as a method capable of precisely and highly accurately catching a three-dimensional structure of molecules.

On the other hand, in this single-crystal X-ray structure analysis, there has been such a large constraint that a single-crystal needs to be prepared by crystallizing a sample. However, as is known from not only the following Non-Patent Documents 1 and 2 but also Patent Document 2, the single-crystal X-ray structure analysis becomes widely applicable for those including a liquid compound that cannot be crystallized, a sample incapable of acquiring a sufficient amount for crystallization, and so forth via development of a material called "crystalline sponge" (for example, a porous complex crystal in which countless pores each having a diameter of 0.5 to 1 nm are formed).

PRIOR ART DOCUMENT

Patent Document

Patent Document 1: Japanese Unexamined Patent Application Publication No. 2007-3394

Patent Document 2: Re-publication of PCT International Publication WO2016/017770

Non-Patent Document

Non-Patent Document 1: Makoto Fujita; X-ray analysis on the nanogram to microgram scale using porous complexes; Nature 495, 461-466; 28 Mar. 2013

Non-Patent Document 2: Hoshino et al. (2016), The updated crystalline sponge method IUCrJ, 3, 139-151

SUMMARY OF THE INVENTION

Problems to be Solved by the Invention

However, in the single-crystal X-ray structure analysis as becoming a conventional technique in which the above-described crystalline sponge is used, it is necessary to quickly and accurately perform a step of soaking a sample of a very small amount of approximately several ng to several µg separated by every kind of devices in a framework of a very small and fragile crystalline sponge having a size of approximately 100 µm, and further a step of accompanying fine and precise operations in which the very small crystalline sponge in which the sample is soaked is taken out; is attached to a tool; and is installed at the X-ray irradiation position inside a single-crystal X-ray structure analysis apparatus. In addition, these fine and precise operations carried out in a short period of time largely affect the measurement result of the sample after being soaked in the crystalline sponge, thereby being very important operations. Further, it is also important to additionally manage information about not only the crystalline sponge but also the sample for preparation of the sample and its management, measurement and analysis, subsequent verification and storage, and so forth.

Accordingly, the present invention has been achieved in view of problems in the above-described conventional technique, and the objective is, specifically, to enable quickly, surely and easily performing single-crystal X-ray structure analysis without conventionally fine and precise operations for which quickness is required being accompanied, with a very small and fragile crystalline sponge, even if not having specialized knowledge of X-ray structure analysis, in other words, to more facilitate management of the information about the sample together with the crystalline sponge for the preparation and management of the sample, the measurement, the subsequent storage and verification and so forth, in other words, the object is to provide high-yield, efficient, very versatile and user-friendly single-crystal X-ray structure analysis apparatus and method; and further to provide a sample holder (that may include an applicator) as a tool therefor.

Means to Solve the Problems (1) In order to achieve the above-described object, it is a feature that the single-crystal X-ray structure analysis apparatus according to the present invention is a single-crystal X-ray structure analysis apparatus that performs a structure analysis of a material, the single-crystal X-ray structure analysis apparatus comprising an X-ray source that generates X-rays; a sample holder comprising a porous complex crystal capable of soaking a sample in a plurality of fine pores formed therein; a goniometer that rotationally moves, the sample holder being attached to the goniometer; an X-ray irradiation section that irradiates the X-rays from the X-ray source to the sample held by the sample holder attached to the goniometer; an X-ray detection measurement section that detects and measures X-rays diffracted or scattered by the sample; a structure analysis section that performs a structure analysis of the sample based on the diffracted or scattered X-rays measured by the X-ray detection measurement section; an information acquisition section that acquires invariable information about the porous complex crystal or variable information provided after the sample is soaked therein; and an information storage section that stores the invariable information or the variable information acquired by the information acquisition section.

(2) Further, it is a feature that in the single-crystal X-ray structure analysis apparatus according to the present invention, the variable information comprises at least one of a condition under which the sample is prepared, a soaking condition, a soaking result, a measurement condition and a measurement result.

(3) Further, it is a feature that in the single-crystal X-ray structure analysis apparatus according to the present invention, the invariable information comprises at least one of a type of the porous complex crystal, a manufacturer, a site of manufacture, a date of manufacture, a lot number, and support information.

(4) Further, it is a feature that in the single-crystal X-ray structure analysis apparatus according to the present invention, the X-ray detection and measurement of the sample, or the structure analysis of the sample is performed based on the invariable information or the variable information stored by the information storage section.

(5) Further, it is a feature that in the single-crystal X-ray structure analysis apparatus according to the present invention, the invariable information or the variable information acquired by the information acquisition section is information held in an information holding section provided on the sample holder, or an applicator inside which the sample holder is stored.

(6) Further, it is a feature that in the single-crystal X-ray structure analysis apparatus according to the present invention, the information holding section is a bar code displayed on the sample holder or the applicator, and the bar code comprises the invariable information or the variable information.

(7) Further, it is a feature that in the single-crystal X-ray structure analysis apparatus according to the present invention, the information holding section is a semiconductor storage device attached to the sample holder or the applicator, and the invariable information or the variable information is stored in the semiconductor storage device.

(8) Further, it is a feature that in the single-crystal X-ray structure analysis apparatus according to the present invention, the invariable information or the variable information acquired by the information acquisition section is information acquired based on inherent information held or displayed by the sample holder, or an applicator inside which the sample holder is stored; and held other than the sample holder and the applicator.

(9) Further, it is a feature that the single-crystal X-ray structure analysis method according to the present invention is a single-crystal X-ray structure analysis method for performing a structure analysis of a material using a sample holder, the single-crystal X-ray structure analysis method comprising a soaking step of introducing a sample to be analyzed into a porous complex crystal held in the sample holder to soak the sample therein; an attachment step of attaching the sample holder after soaking the sample therein, to a goniometer in a single-crystal X-ray structure analysis apparatus; an information acquisition step of acquiring invariable information about the porous complex crystal or variable information provided after the step of soaking the sample therein; an information storage step of storing the invariable information or the variable information that has been acquired; an X-ray detection measurement step of irradiating X-rays from an X-ray source in the single-crystal X-ray structure analysis apparatus to the sample to detect and measure X-rays diffracted or scattered by the sample; and a structure analysis step of performing a structure analysis of the sample, based on the diffracted or scattered X-rays detected and measured by the X-ray detection measurement step.

(10) Further, it is a feature that in the single-crystal X-ray structure analysis method according to the present invention, the variable information comprises at least one of a condition under which the sample is prepared, a soaking condition, a soaking result, a measurement condition and a measurement result.

(11) Further, it is a feature that in the single-crystal X-ray structure analysis method according to the present invention, the invariable information comprises at least one of a type of the porous complex crystal, a manufacturer, a site of manufacture, a date of manufacture, a lot number, and support information.

(12) Further, it is a feature that in the single-crystal X-ray structure analysis method according to the present invention, the X-ray detection measurement step or the structure analysis step is performed based on the invariable information or the variable information stored in the information storage step.

Effect of the Invention

According to the above-described present invention, a series of operations including soaking a sample in a very small and fragile crystalline sponge, followed by installing it in an apparatus can be quickly, surely and easily carried out by comprising a newly proposed sample holder (that may include an applicator), means for acquiring related information and means for further storing the information, without accompanying conventionally precise and fine operations for which quickness is also required; in other words, additionally, managing information about the sample together with a very small crystalline sponge can be more facilitated including an input operation, a subsequent search operation, and so forth; in other words, provided is a high-yield, efficient, very versatile and user-friendly single-crystal X-ray structure analysis apparatus. Further provided are an analysis method thereof and the sample holder as a tool (that may include the applicator) therefor. Thus, it becomes possible to make a single-crystal X-ray structure analysis with the above-described very small crystalline sponge be easily usable, and to widely spread it.

DETAILED DESCRIPTION OF EMBODIMENTS

Next, the single-crystal X-ray structure analysis apparatus in which a crystalline sponge is utilized, according to one embodiment of the present invention, is described in detail referring to the attached drawings. In addition, the expression of "A or B" in the present application means "at least one of A and B", and includes "A and B" unless there are exceptional circumstances where there exists no possibility of A and B.

Figure 1:
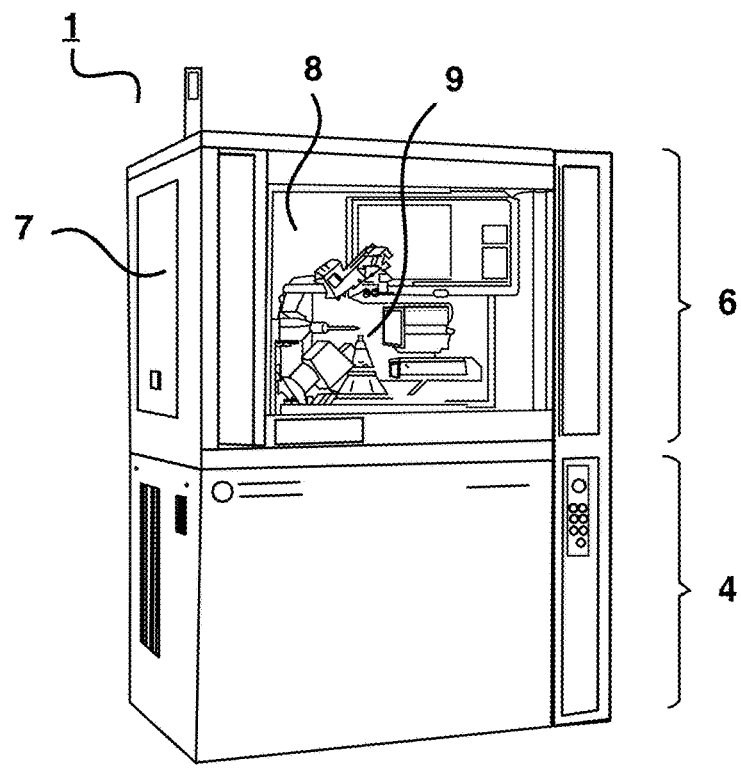
FIG. 1 is a diagram showing a whole configuration of a single-crystal X-ray structure analysis apparatus provided with a single-crystal X-ray diffractometer according to one embodiment of the present invention.

The attached FIG. 1 shows the entire appearance configuration of a single-crystal X-ray structure analysis apparatus including a single-crystal X-ray diffractometer according to one embodiment of the present invention, and as is clear from the figure, the single-crystal X-ray structure analysis apparatus 1 comprises a base stand 4 in which a cooling device and an X-ray generation power supply unit are stored, and an X-ray protection cover 6 placed on the base stand 4.

The X-ray protection cover 6 is provided with a casing 7 for surrounding the single-crystal X-ray diffractometer 9, a door 8 provided in front of the casing 7, and so forth. The door 8 provided in front of the casing 7 is openable, and in this open state, various operations can be performed for the internal single-crystal X-ray diffractometer 9. In addition, the present embodiment as shown in the figure is directed to the single-crystal X-ray structure analysis apparatus 1 provided with the single-crystal X-ray diffractometer 9 for performing a structure analysis of a material using the crystalline sponge mentioned below.

Figure 2:
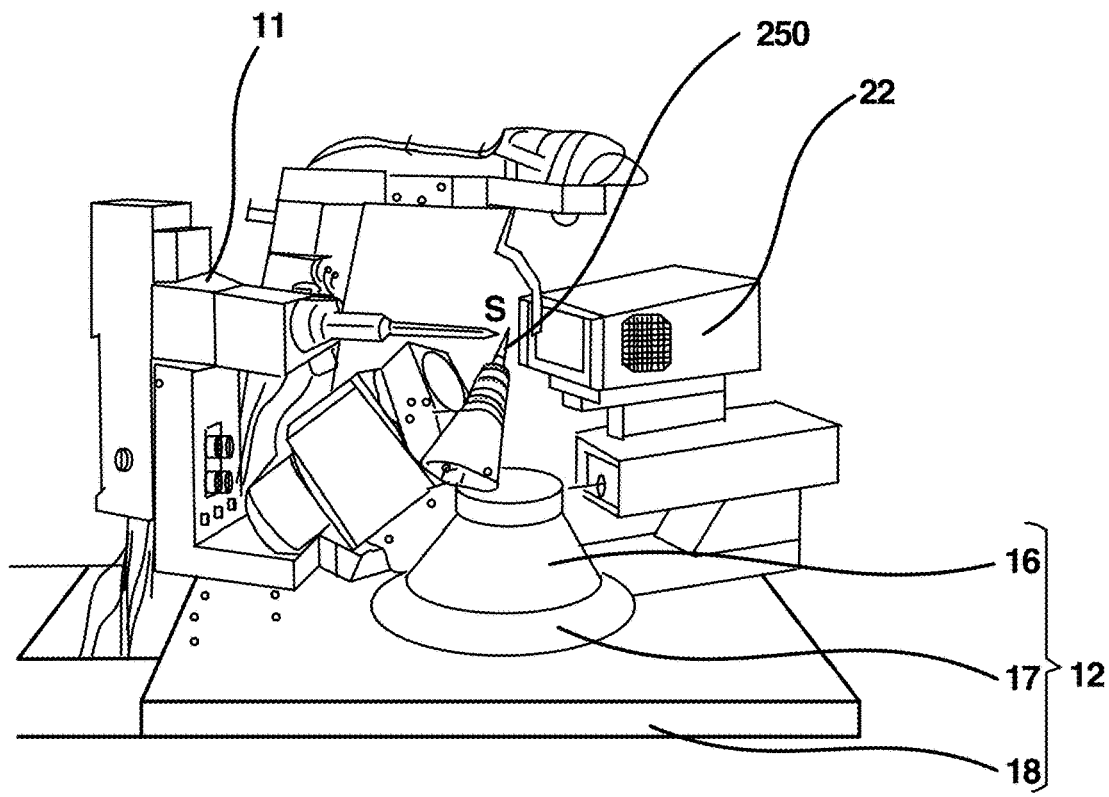
FIG. 2 is a diagram showing a configuration of the above-described single-crystal X-ray diffractometer.

The single-crystal X-ray diffractometer 9 comprises an X-ray tube 11 and a goniometer 12, as shown in FIG. 2 as well. The X-ray tube 11 comprises a filament, a target (referred to also as "anticathode") arranged so as to be opposed to the filament, and a casing for airtightly storing them, though not shown in the figure herein. This filament subjected to current applied by the X-ray generation power supply unit stored in the base stand 4 of FIG. 1 generates heat to emit thermal electrons. Further, a high voltage is applied between the filament and the target by the X-ray generation power supply unit, and the thermal electrons emitted from the filament are accelerated by the high voltage, and collide with the target. This collision area forms an X-ray focus, and X-rays are generated from the X-ray focus, and are spread out. In more detail, though not shown in the figure herein, the X-ray tube 11 comprising a microfocus tube and an optical element such as a multilayer focusing mirror or the like enables irradiation with higher brightness beam, and can also be selected from a radiation source such as Cu, Mo, Ag or the like. As exemplified above, the filament, the target arranged so as to be opposed to the filament, and the casing for airtightly storing them serve as an X-ray source, and a configuration for X-ray irradiation comprising the microfocus tube and the optical element such as the multilayer focusing mirror or the like serves as an X-ray irradiation section.

Further, the goniometer 12 supporting a sample S to be analyzed comprises a θ rotation table 16 that is rotatable with a sample axis line ω passing through an X-ray incident point of the sample S as a center, and a 2θ rotation table 17 that is arranged around the θ rotation table 16 and is rotatable with the sample axis line ω as a center. In addition, according to the present embodiment, the sample S is soaked inside a crystalline sponge previously attached to a part of the sample holder 250 mentioned below. Driving devices (not shown in the figure) for driving the above-described θ rotation table 16 and 2θ rotation table 17 are stored inside a base 18 of the goniometer 12, and the θ rotation table 16 is driven by these driving devices to be intermittently or continuously rotated at a predetermined angular speed so as to make a so-called θ rotation. Further, the 2θ rotation table 17 is driven by these driving devices to be intermittently or continuously rotated so as to make a so-called 2θ rotation. The above-described driving devices can be constituted from any structure, and for example, can be constituted from a power transmission structure comprising a worm and a worm wheel.

An X-ray detector 22 is placed on a part of the outer periphery of the goniometer 12, and the X-ray detector 22 is constituted from for example, CCD type and CMOS type two-dimensional pixel detectors, a hybrid type pixel detector, or the like. In addition, an X-ray detection measurement section means a configuration in which X-rays diffracted or scattered by the sample are detected and measured, and comprises the X-ray detector 22 and a control section that controls the same.

The single-crystal X-ray diffractometer 9 is constituted as described above, and thus the sample S is θ-rotated with the sample axis line ω as a center by the θ rotation of the θ rotation table 16 in the goniometer 12. During the θ rotation of this sample S, X-rays generated from the X-ray focus inside the X-ray tube 11, that is directed to the sample S enter the sample S at a predetermined angle, and are diffracted/scattered. That is, the incident angle of X-rays entering the sample S changes depending on the θ rotation of the sample S.

When the Bragg diffraction condition between an incident angle of X-rays entering the sample S and a crystal lattice plane is satisfied, diffraction X-rays are generated from the sample S. The diffraction X-rays are received by the X-ray detector 22 to measure an X-ray intensity thereof. From those described above, an angle of the X-ray detector 22 with respect to the incident X-rays, that is, an intensity of the diffraction X-rays corresponding to a diffraction angle is measured, and a crystal structure concerning the sample S and so forth are analyzed from this measurement result.

Figure 3A:
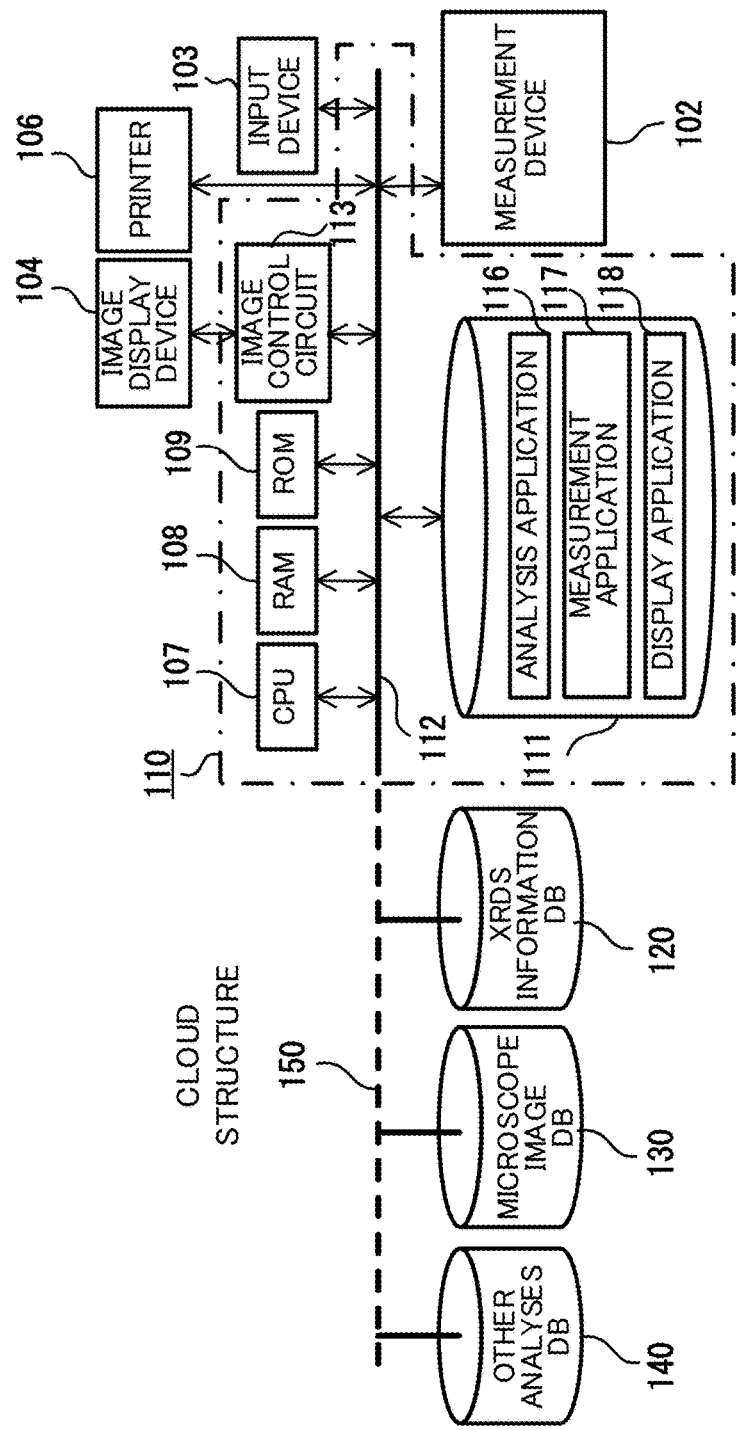
FIG. 3A is a block diagram showing an electrical configuration inside the above-described single-crystal X-ray structure analysis apparatus.

Next, FIG. 3A shows one example of the detail of an electrical internal configuration constituting a control section 110 in the above-described single-crystal X-ray structure analysis apparatus. In addition, as a matter of course, the present invention is not limited to the following embodiments according to the present invention.

This single-crystal X-ray structure analysis apparatus 1 includes the above-described internal configuration and further comprises a measurement device 102 for measuring a suitable material used as a sample; an input device 103 constituted from a keyboard, a mouse and so forth; an image display device 104 as display means; a printer 106 as means for printing and outputting the analysis result; CPU (Central Processing Unit) 107; RAM (Random Access Memory) 108; ROM Read Only Memory) 109; a hard disk 111 as an external storage medium, and so forth. These elements are electrically connected mutually by a bus 112.

The image display device 104 constituted from an image display unit such as a CRT display, a liquid-crystal display or the like displays an image on a screen in accordance with an image signal generated by an image control circuit 113. The image control circuit 113 generates the image signal based on image data input therein. The image data input in the image control circuit 113 is generated by an operation of every kind of calculation means, achieved by a computer comprising CPU 107, RAM 108, ROM 109, and the hard disk 111. An inkjet plotter, a dot printer, an inkjet printer, an electrostatic transfer printer, or any other printing unit having arbitrary structure is usable for the printer 106. In addition, the hard disk 111 can also be constituted from a magneto-optical disk, a semiconductor memory, or any other storage medium having arbitrary structure.

Analysis application software 116 for managing the overall operation of the single-crystal X-ray structure analysis apparatus 1, measurement application software 117 for managing the operation of the measurement processing using the measurement device 102, and display application software 118 for managing the operation of the display processing using the image display device 104 are stored inside the hard disk 111. A predetermined function is achieved after reading these pieces of application software from the hard disk 111, as needed, to transfer them to RAM 108.

This single-crystal X-ray structure analysis apparatus 1 further comprises for example, a database placed in a cloud area, the database for storing every kind of measurement results including measurement data obtained by the above-described measurement device 102. Referring to an example of the figure, as is explained below, an XRDS information database 120 that stores XRDS image data obtained by the above-described measurement device 102, and a microscope image database 130 that stores actually observed images obtained by the microscope, and further, for example, measurement results obtained via analysis performed with not X-rays but XRF, Raman ray or the like, and another analysis database 140 that stores physical property information are shown. In addition, these databases are not necessarily stored inside the single-crystal X-ray structure analysis apparatus 1, and for example, they may be provided outside and be communicably connected mutually via a network 150 or the like.

Figure 3B:
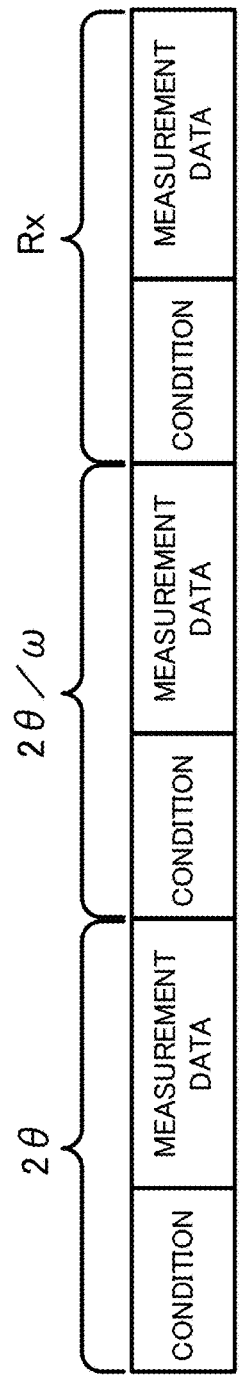
FIG. 3B is a configuration inside the data file.

A method of storing individual measurement data inside an individual file is also taken into account as a file management method for storing a plurality of pieces of measurement data inside a data file, but according to the present embodiment, as shown in FIG. 3B, the plurality of pieces of measurement data are set to be continuously stored inside one data file. In addition, referring to FIG. 3B, storage areas each in which "condition" is written are an area for storing every kind of information including device information and measurement conditions when obtaining the measurement data.

As such measurement conditions, (1) name of measurement object material, (2) type of measurement device, (3) measurement temperature range, (4) measurement start time, (5) measurement end time, (6) measurement angle range, (7) moving speed in scanning movement system, (8) scanning condition, (9) type of X-rays incident on sample, (10) whether or not to use attachments such as a sample high-temperature device, and so forth, are conceivable and every kind of other conditions is also conceivable. In addition, a file management method of this measurement result is also described below in detail.

Figure 4:
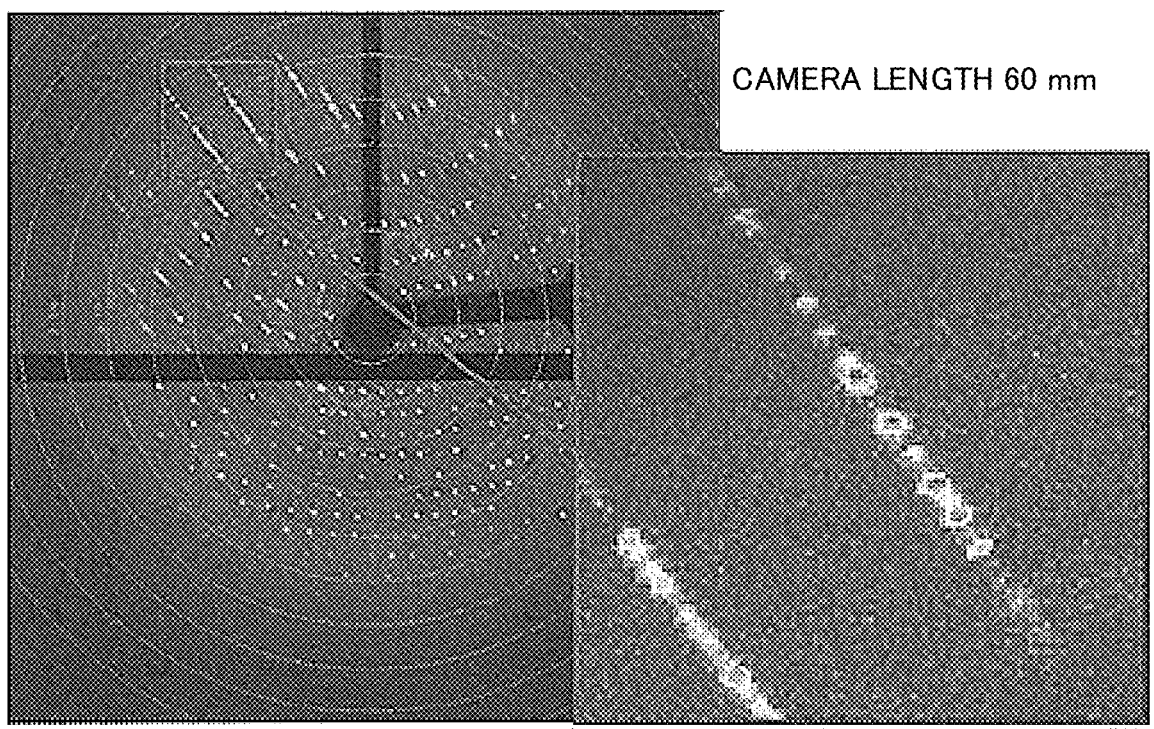
FIG. 4 is a diagram including a photograph showing an XRDS pattern or an image obtained by the above-described single-crystal X-ray structure analysis apparatus.

An XRDS (X-ray Diffraction and Scattering) pattern or an image (Refer to FIG. 4) is obtained by receiving/accumulating X-rays received on a flat plane that is a two-dimensional space of the X-ray detector 22 constituting the above-described measurement device 102 for each pixel arranged in planar array, that constitutes the detector, and by measuring an intensity thereof. For example, a pattern or an image on a two-dimensional space of r and θ can be obtained by detecting the intensity of X-rays received via an integral, for each pixel of the X-ray detector 22.

Measurement Application Software

The XRDS pattern or the image on an observation space, that is obtained by diffraction and scattering of X-rays caused by an object material for irradiation of the X-rays reflects information of an electron density distribution in an actual space of the object material. However, the XRDS pattern being on the two-dimensional space of r and θ does not directly represents symmetry in the actual space of the object material as a three-dimensional space. Accordingly, it is generally difficult to specify the(spatial) arrangement of atoms and molecules that constitute the material with only the existing XRDS image, and thus a specialized knowledge of X-ray structure analysis is required. Therefore, according to the present Example, automatization is achieved by adopting the above-described measurement application software. In this manner, the single-crystal X-ray structure analysis apparatus 1 receives and manages every kind of measurement results including measurement data obtained by detecting X-rays diffracted or scattered by a sample with the X-ray detection measurement section while controlling a measurement processing operation using the measurement device 102. Further, the sample is subjected to structure analysis with a structure analysis section, based on every kind of measurement results including the measurement data obtained by detecting the X-rays diffracted or scattered by the sample.

Figure 5A:
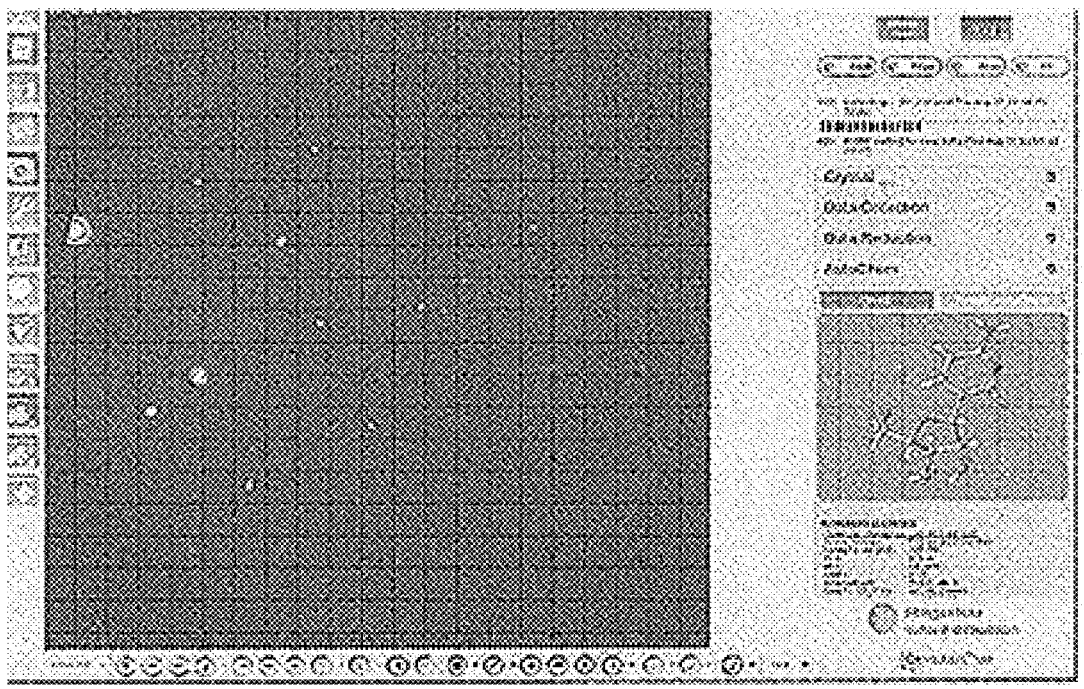
FIG. 5A(5B) is a diagram including a photograph showing one example of a screen obtained by executing X-ray diffraction data measurement/processing software on the above-described single-crystal X-ray structure analysis apparatus.
Figure 5B:
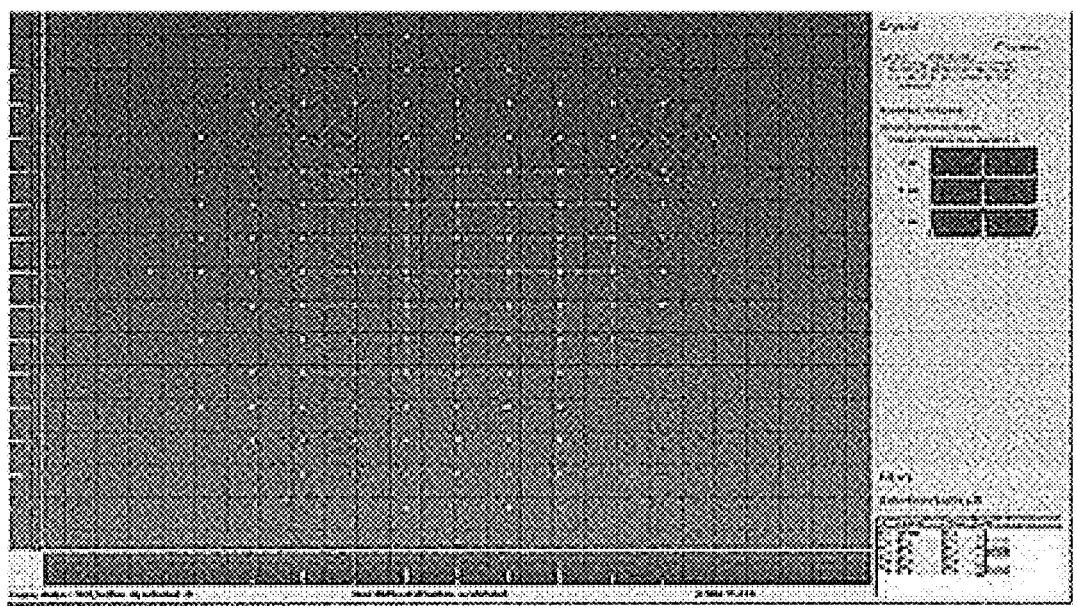
Figure 6:
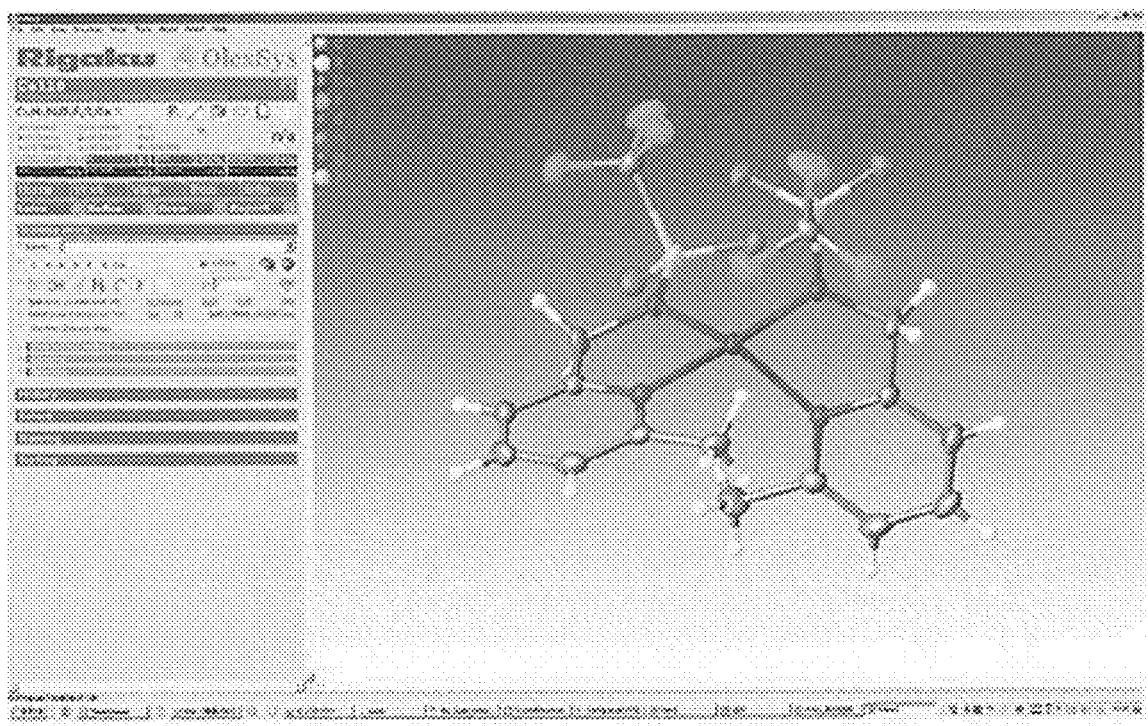
FIG. 6 is a diagram including a screen showing a molecular model prepared using a structure analysis program of the above-described single-crystal X-ray structure analysis apparatus.

For one example, as shown in the execution screens of FIGS. 5A and 5B, X-ray diffraction data measurement/processing software called "CrysAlis$^{Pro}$" that is a platform for single-crystal structure analysis is installed to execute preliminary measurement, setting of measurement conditions, main measurement, data processing and so forth. Further, structure analysis and structure refinement are executed in parallel with X-ray diffraction data collection by installing an automatic structure analysis plug-in called "AutoChem". Then, from space group determination to phase determination, construction and correction of molecular modelling, structure refinement, final reporting, and preparation of a CIF file are executed by a structure analysis program called "Olex$^2$" as also shown in FIG. 6.

The whole structure of the single-crystal X-ray structure analysis apparatus 1, and its function have been described as above, and a crystalline sponge according to the present invention, and devices and tools related thereto are specifically described below in detail, referring to the attached drawings.

Crystalline Sponge

As described above, the single-crystal X-ray structure analysis has become widely applicable for those including a liquid compound that cannot be crystallized, a very small amount of a sample with several ng to several μg that is incapable of acquiring a sufficient amount to perform crystallization, or the like via development of a material called "crystalline sponge" as a very small and fragile porous complex crystal having an approximate size of several 10 μm to several 100 μm, in whose inside countless pores each having a diameter of 0.5 to 1 nm are formed.

However, in the current situation, in order to perform soaking (post-crystallization) as crystallization of a sample into a framework of the above-described crystalline sponge, as previously described, required is a step of soaking a very small amount of a sample, approximately several ng to several μg, separated by every kind of pretreatment (separation) devices in a framework of a very small and fragile crystalline sponge having an outer diameter of approximately 100 μm provided via immersion in a preserving solvent (carrier) such as cyclohexane or the like, inside a container. Subsequently, further required is a step of taking out, from a container, a very small, fragile and difficultly handleable crystalline sponge in a quick manner (in a short period of time in such an extent that the crystalline sponge is not broken due to drying), and accurately attaching it to an X-ray irradiation position inside a single-crystal X-ray diffractometer, more specifically, to a tip portion of a sample axis of the goniometer 12 (so-called goniometer head pin) while performing centering. These steps are not only fine operations for which high preciseness is required but also those for which quickness is required for the operator, regardless of presence/absence of a specialized knowledge of X-ray structure analysis, thereby resulting in having a large influence on the measurement result of a sample after being soaked in the crystalline sponge. That is, these operations make single-crystal X-ray structure analysis using a very small crystalline sponge result in low yield, and thus this becomes one of the causes of suppressing the single-crystal X-ray structure analysis using the crystalline sponge from being widely used.

In addition, it becomes difficult not only to handle the crystalline sponge but also to perform storage, verification and management after measurement, due to a very small size of the crystalline sponge having an outer diameter of approximately 100 μm.

The present invention that has been accomplished based on the above-described inventor's knowledge enables quickly, surely and easily performing a single-crystal X-ray structure analysis with a very small and fragile crystalline sponge and enables easily and surely performing management of information about the sample together with the very small crystalline sponge, including not only an input operation thereof but also a search of the information about verification, storage, management or the like after measurement by using a sample holder for the crystalline sponge (also referred to simply as a sample holder) and an applicator as a handling (operating) tool thereof as described below, in other words, achieves a high-yield, efficient, very versatile and user-friendly single-crystal X-ray structure analysis apparatus. That is, as to the next-generation single-crystal X-ray structure analysis apparatus according to the present invention, there is a large constraint that the very small and fragile crystalline sponge in which a very small amount of sample is soaked is prepared, and further the sample S (crystalline sponge) needs to be taken up from a soaking container and precisely and quickly attached to a predetermined position at the tip portion of the goniometer 12 in a short and quick period of time in such an extent that the crystalline sponge is not broken due to drying, but specifically in order to achieve the very versatile and user-friendly apparatus, such operations need to be made quickly and easily executable without requiring highly specialized knowledge as well as operation preciseness.

The present invention described below in detail resolves such a problem, that is, provides a single-crystal X-ray structure analysis apparatus and a method therefor that are capable of high-yield efficient, very versatile and user-friendly performance in a quick, sure and easy manner, that is carried out by anyone while also using a very small, fragile and difficultly handleable crystalline sponge; and that simultaneously make it possible to easily and surely perform management of information about the sample together with the crystalline sponge (information required in operations such as preparation before measurement, handling, storage and management, verification and storage after measurement, and so forth) by anyone, including an input operation and a subsequent search operation thereof; and further provides a sample holder comprising an applicator, as a tool therefor.

Figure 7A:
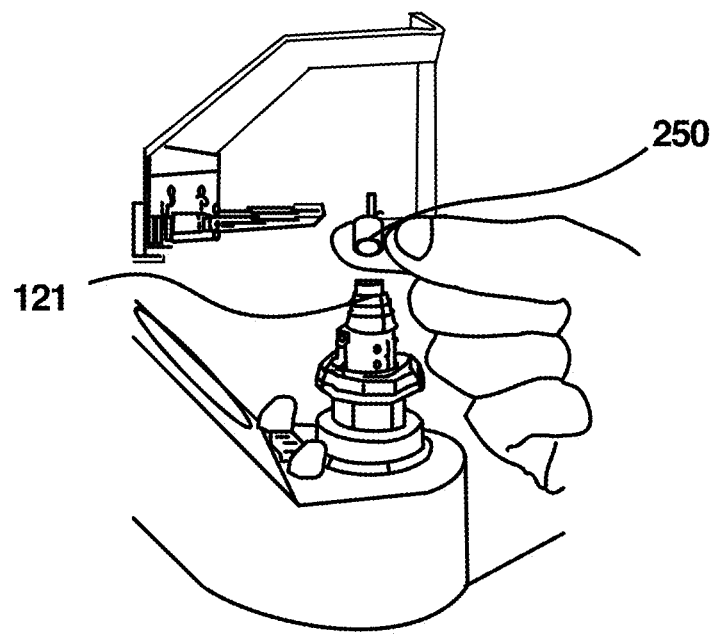
FIG. 7A is a diagram including a photograph showing one example of a structure centering on a goniometer of the above-described single-crystal X-ray diffractometer.
Figure 7B:
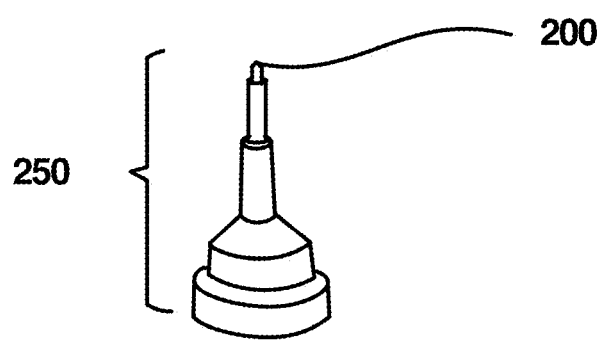
FIG. 7B is a diagram showing the sample holder.

FIG. 7A shows a tip portion of the goniometer 12 in an enlarged view, and in this figure, a state where a tool, to the tip portion of which the crystalline sponge 200 for soaking a sample to be analyzed therein that is proposed according to the present invention is attached in advance, that is, the sample holder 250 as showing an enlarged view in FIG. 7B is attached (mounted) to the goniometer head 121 at the tip portion of the goniometer 12, is shown. In addition, the sample holder 250, for example, can be attached/detached to/from the goniometer head 121 at the tip portion of the goniometer 12 by an attaching/positioning mechanism for which magnetic force or the like is used, and can be attached easily and accurately at an exact position by anyone.

Sample Holder for Crystalline Sponge, and Applicator

Figure 8:
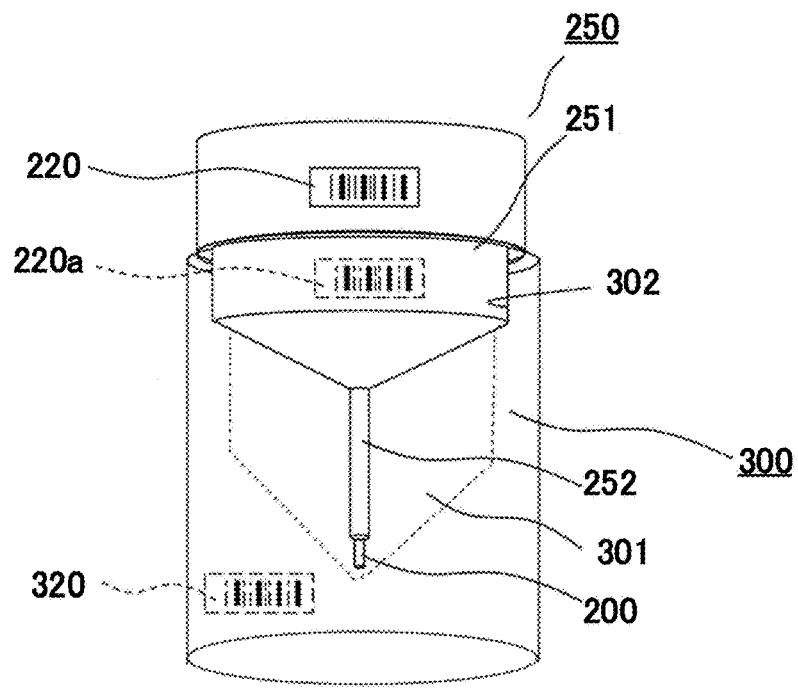
FIG. 8 is a perspective view showing a whole configuration of a sample holder comprising a bar code attached onto the above-described goniometer.
Figure 9:
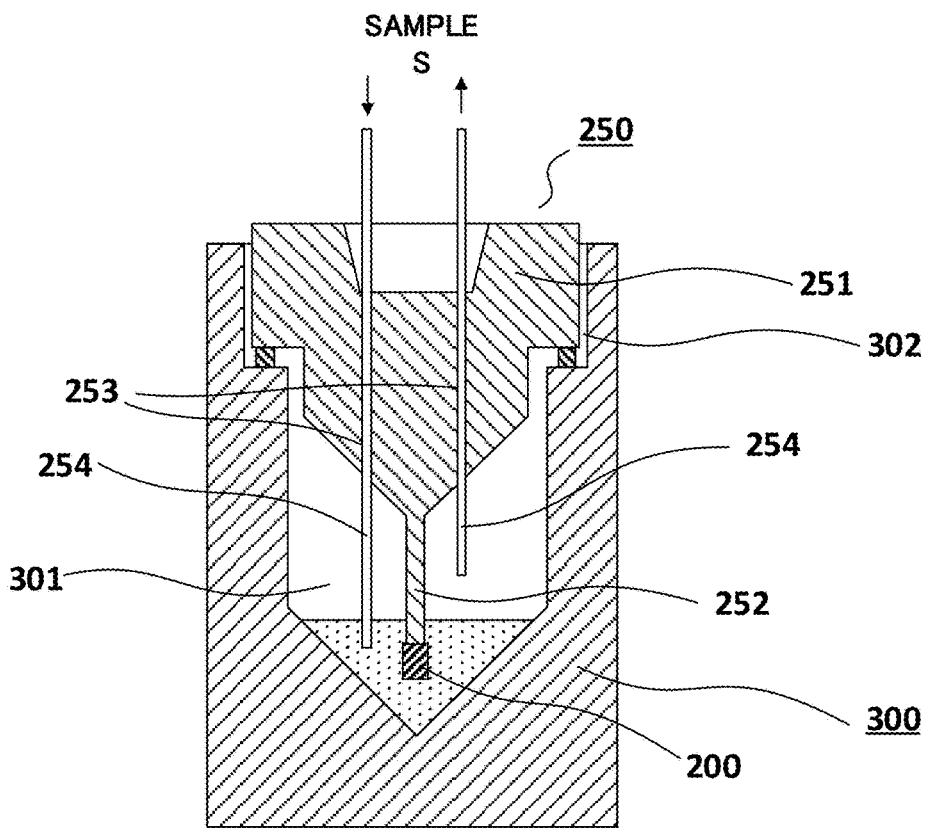
FIG. 9 is a sectional view of the above-described sample holder.

FIG. 8 and FIG. 9 show a whole perspective view of the above-described sample holder 250 and a sectional view thereof, respectively. In the sample holder 250, a pin (cylinder)-shaped sample holding part (hereinafter, referred to simply as a holding part) 252 (corresponding to the so-called goniometer head pin) is implanted vertically in the center of one surface (the lower surface in the figure) of the base part 251 of a disk or corn-shaped holder made of metal or the like attached to the goniometer head 121 {Refer to FIG. 7A} at the tip portion of the goniometer 12, and the crystalline sponge 200 in which the above-described sample to be analyzed is soaked is combinedly attached and fixed to the sample holder 250 beforehand at a predetermined position of the tip of the pin-shaped holding part 252. Further, the positioning mechanism or the like such as a magnet that is not shown in the figure, or the like is provided on the other surface (upper surface in the figure) of the disk-shaped base part 251. The sample holder 250 is detachably attached to the tip portion of the goniometer 12 by this positioning mechanism.

Further, in FIGS. 8 and 9, the so-called applicator 300 used with the sample holder 250 is shown as a handling (operating) tool for soaking the sample in the crystalline sponge 200 attached to the sample holder in advance. This applicator 300 is, for example, formed from a transparent or non-transparent member made of glass, a resin, metal or the like, in whose interior a storing space 301 for storing the above-described sample holder 250 is formed, and at whose upper portion the opening 302 through which the sample holder 250 is fitted and taken out is further formed.

Further, for example, seal portions (shown in the figure by hatched line parts) are provided at part of the opening 302 of the applicator 300 so as to be airtightly maintained from outside in a state of storing the sample holder 250 in the storing space 301 in an inside thereof. On the other hand, a pair of fine through holes 253, 253 for introducing a sample to be analyzed into the crystalline sponge 200 located inside (storing space 301) the applicator 300 are formed at the base part 251 of the sample holder 250. The fine holes 253, 253 exhibit preferable one example of a sample introduction structure, and other structures may be adopted. In addition, though not shown in the figure, seal portions are provided for these fine holes 253, 253. In this manner, as shown in the figure, the storing space 301 inside the applicator 300 is kept airtight even in a state where sample introduction tubes (hereinafter, referred to simply as introduction tubes) 254, 254 for introducing the sample into the crystalline sponge 200 are inserted in the fine holes 253, 253.

According to the sample holder 250 with such a configuration, alternatively, further by being combinedly provided (unitized) with the applicator 300 as a handling (operating) tool thereof, the crystalline sponge 200 attached to the tip portion of the pin-shaped holding part 252 (corresponding to a goniometer head pin) constituting a part of the sample holder 250 can be safely and easily handled without damage, or deviation from the sample holder 250. That is, the crystalline sponge 200 in which a very small amount of the sample is soaked can be safely, simply and easily prepared on the goniometer head 121 in a short and quick period of time in such an extent that no damage occurs due to drying, without any damage due to taking only it out from a soaking container unlike a conventional manner. According to the present Example, the sample holder 250 with which soaking of the sample is completed is removed from the applicator 300, and is attached to the goniometer head 121 {Refer to FIG. 7A} at the tip portion of the goniometer 12. In this manner, the sample S soaked in the crystalline sponge 200 is easily, precisely and quickly arranged at a predetermined position inside the single-crystal X-ray diffractometer 9 without requiring highly specialized knowledge and precise operations.

In addition, inherent information 220 (Refer to FIG. 8) as information for specifying the crystalline sponge 200 previously attached to the tip portion of the pin-shaped holding part 252 and having a sample to be analyzed soaked is displayed (held) on a part of the above-described sample holder by for example, sheet adhesion, emboss-processing, or the like. More specifically, in the present example, this information is displayed as a bar code 220 on the outer-peripheral face of the base part 251 that is a part of the sample holder 250. When the applicator 300 is transparent, the bar code 220 as this inherent information may be attached onto the place covered by the applicator 300 as shown in the figure by 220a, or when the applicator 300 is not transparent, is may be attached on the outer-peripheral face of the applicator 300 (Refer to the symbol 320 in FIG.8). That is, it may be preferred as a matter of course that the bar code as inherent information is attached onto the place that is visually recognizable from outside even in a state where the sample holder 250 is stored inside the applicator 300.

Figure 10:
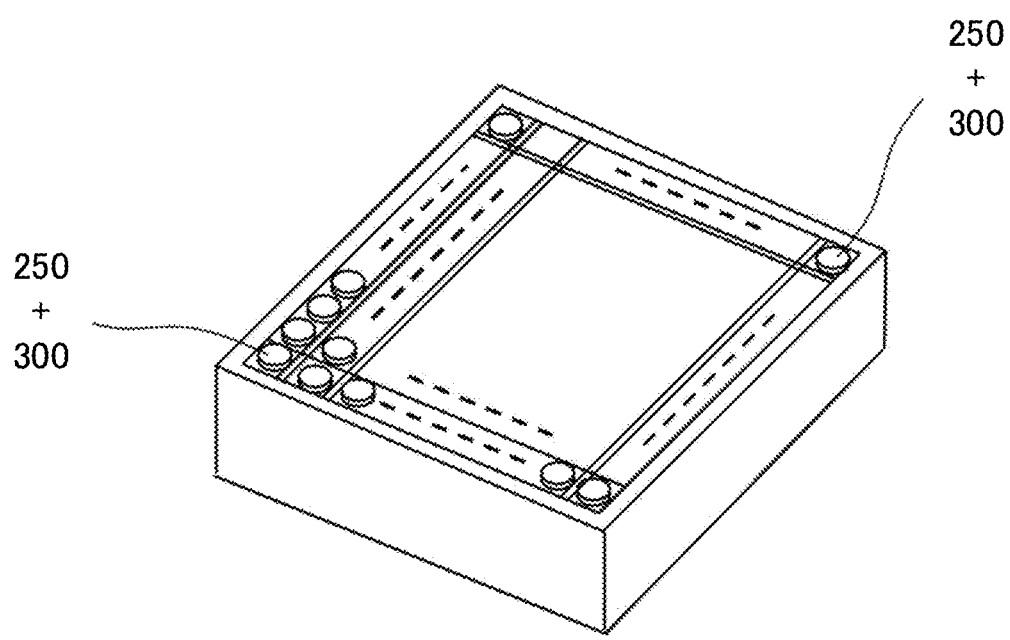
FIG. 10 is a diagram showing one example of a state in a case of providing the above-described sample holder as a set.

In addition, the inherent information is preferably measurement-related information such as the inherent number and related information about a crystalline sponge as well as a sample, the inherent number and related information about a sample holder as well as an applicator and so forth; but is not limited thereto; and may be such information for being able to specify and obtain the corresponding invariable information and variable information. Further, a storing position of each applicator in a sample case shown in FIG. 10 may be usable as inherent information. Further, the sample holder 250 can be integrated (unitized) with the applicator 300 as a handling (operating) tool thereof, and further can be provided as a so-called set by preparing the required number of them for the analysis operation and storing them in a box-shaped case, as also shown in FIG. 10.

Single-Crystal X-Ray Structure Analysis Method Using Sample Holder for Crystalline Sponge Next, the single-crystal X-ray structure analysis method performed using the sample holder 250 to which the crystalline sponge 200 is previously attached, and the applicator 300 as a handling tool thereof is explained as below. In addition, the sample holder 250 and the applicator 300 may be provided as an integral one (unit) or as a set, as described above.

Figure 11:
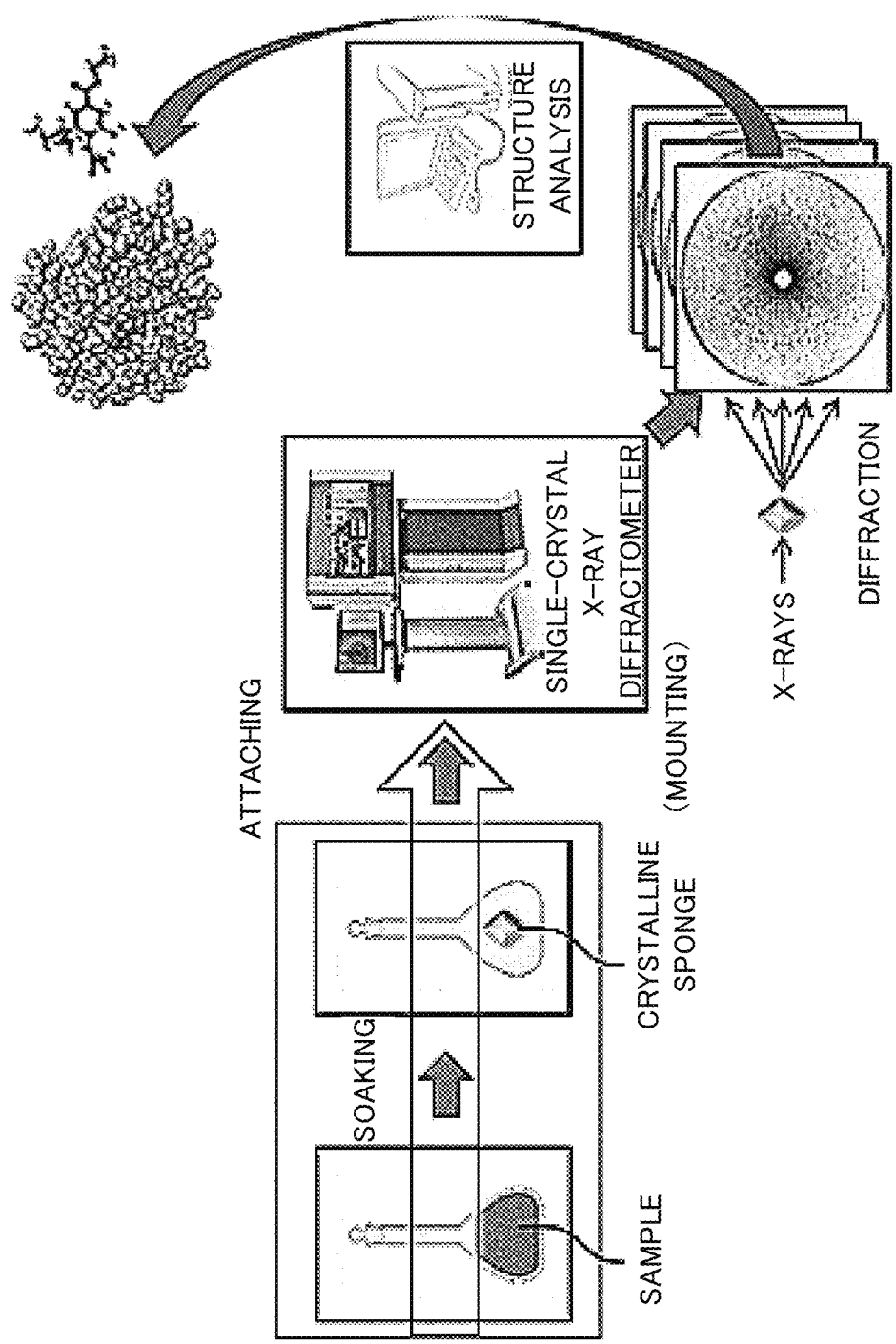
FIG. 11 is a flow diagram showing one example of a single-crystal X-ray structure analysis method using the above-described sample holder.

FIG. 11 shows one Example according to the present invention given by conceptualizing the single-crystal X-ray structure analysis method using the sample holder 250 and the applicator 300. According to such a method, as described above, a very small amount of the sample is introduced into the sample holder 250 provided with the applicator 300 as an integral one (unit) to perform soaking required therein. In this case, according to the above-described example, in the state where the sample holder 250 is stored inside the applicator 300, the sample can be soaked in the crystalline sponge 200 attached to the tip of the sample holder 250 by inserting a pair of the sample introduction tubes 254, 254 from the after-mentioned pretreatment device into a pair of the fine through holes 253, 253 (Refer to FIG. 9) formed in the sample holder 250.

Figure 12:
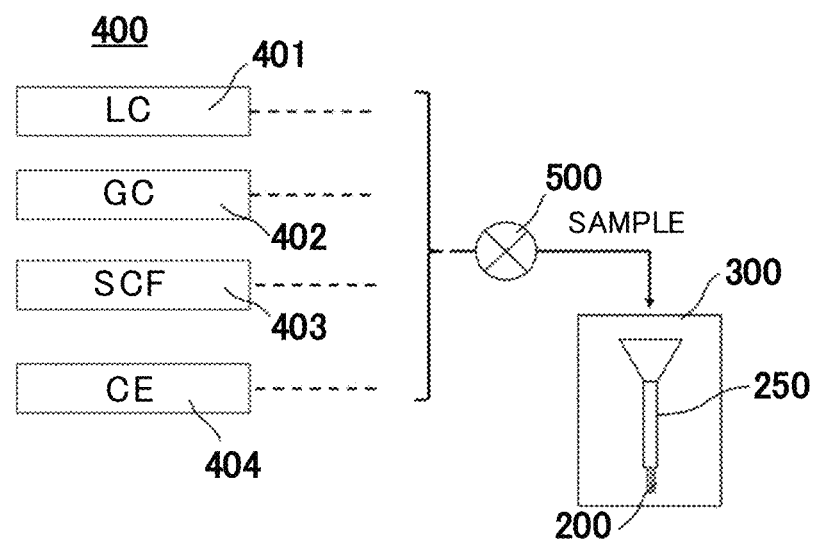
FIG. 12 is a diagram showing one example of a pretreatment device used in the above-described single-crystal X-ray structure analysis method.

More specifically, as shown in FIG. 12, for example, a very small amount of the sample S extracted by LC (liquid chromatography) 401, GC (gas chromatography) 402, and further, SFC (supercritical fluid chromatography) 403, CE (capillary electrophoresis) 404 and so forth that constitute the pretreatment device 400, together with a carrier thereof is supplied to a pair of the sample introduction tubes 254, 254 (Refer to FIG. 9) inserted in the fine holes 253, 253 of the sample holder 250 via the soaking device (soaking machine) 500 provided with every kind of a switching valve and a pressure adjustment device, that supplies a fluid under the necessary conditions (flow rate and pressure), and the sample is selectively introduced into the storing space 301 inside the applicator 300. That is, the sample is sent to the sample introduction tube 254 on the supply side from a tube on the supply side, and is supplied to the sample holder 250 inside the applicator 300 from the tip portion of the sample introduction tube 254 on the supply side. Only the sample, or a solution in which the sample and the preserving solvent (carrier) are mixed is supplied by flowing inside the sample introduction tube 254 on the supply side. In this manner, a very small amount of the sample S introduced thereto comes into contact with the crystalline sponge 200 attached to the tip of the pin-shaped holding part 252 of the sample holder 250 inside the storing space 301 of the applicator 300, and the sample is soaked therein. In addition, examples of the electrophoresis device herein include various electrophoresis devices concerning capillary electrophoresis, isoelectric point electrophoresis, and so forth. When using the soaking device 500, in a state where the sample is injected, the excessive sample or a solution in which the sample and the preserving solvent (carrier) are mixed is discharged from the sample introduction tube 254 on the discharge side, after a predetermined time has elapsed. When not using the soaking device 500, the unnecessary preserving solvent (carrier) or solution flows inside the sample introduction tube 254 on the discharge side, and is discharged. Accordingly, it is possible that no sample flows through the sample instruction tube 254 on the discharge side. When using gas or supercritical fluid as a carrier, the carrier containing the sample is discharged.

Then, the sample holder 250 with which the step of soaking is completed is removed from the applicator 300, and is precisely attached to a predetermined position inside the single-crystal X-ray diffractometer 9, that is, to the goniometer head 121 (Refer to FIG. 7A) at the tip portion of the goniometer 12, for example, by using a positioning mechanism such as the above-described magnetic force or the like. According to the foregoing, the crystalline sponge 200 attached to a part (tip) of the pin-shaped holding part 252 of the sample holder 250 is to be arranged to the tip portion of the goniometer 12, that is, to a position where X-ray beam is focused and irradiated from the X-ray tube 11 after soaking the sample is completed. In other words, the sample S soaked in the crystalline sponge 200 is precisely arranged at a predetermined position inside the single-crystal X-ray diffractometer 9, and the intensity of X-rays diffracted from the sample S is subsequently measured by the X-ray detector 22 to analyze a crystal structure thereof, and so forth.

In this manner, with the sample holder 250 and the applicator 300 that are provided for a sample holder unit according to the present invention, it becomes possible that a very small amount of sample is soaked in the crystalline sponge 200 in very small size, that is combinedly attached beforehand to the sample holder 250, in an easy and safe manner by anyone, and subsequently, the sample S is quickly and safely installed to the goniometer 12 as a precise position with high accuracy in a short period of time in such an extent that the crystalline sponge is not broken due to being dried. In addition, then, it is identical to those in the current condition that X-rays diffracted and scattered by an object material are measured while irradiating X-rays having a required wavelength to the sample S by the above-described single-crystal X-ray diffractometer 9, and the structure analysis is performed by a measurement application software constituting the above-described single-crystal X-ray structure analysis apparatus to carry out construction of molecular modelling, preparation of a final report, and so forth. That is, it becomes possible that the present Example brings quick, safe and easy check of the molecular structure/aggregative structure (actual space) of a newly discovered or designed structure at sites and so forth of not only drug development and life science but also every kind of material research.

Management of Sample Using Sample Holder for Crystalline Sponge

Next, by using inherent information held by a part of the above-described sample holder 250 (or the applicator 300), more specifically, the inherent information displayed from the bar code 220 as an example thereof, a method of managing the crystalline sponge 200 combinedly attached to the sample holder beforehand is described as below.

Figure 13:
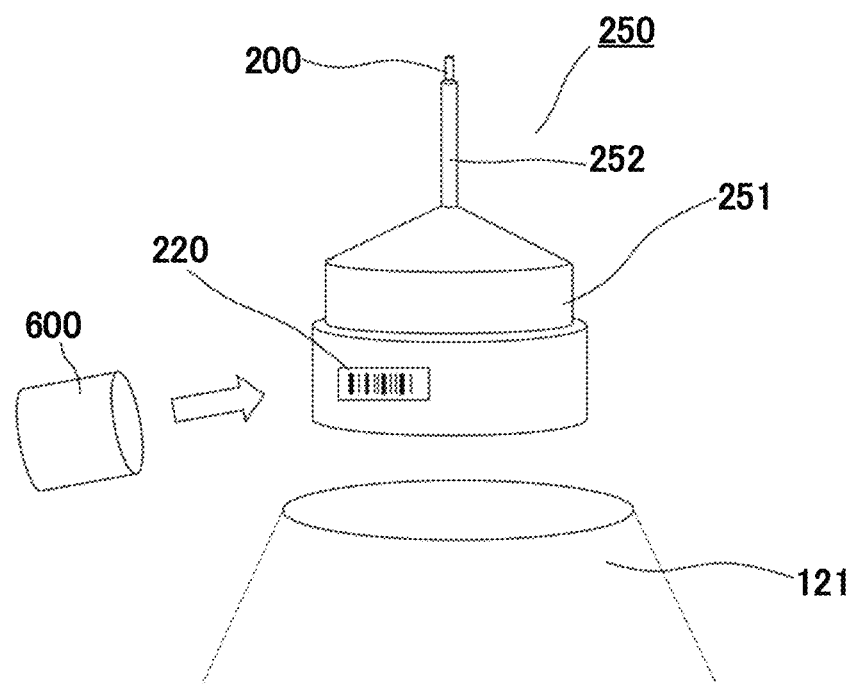
FIG. 13 is a diagram showing a situation of reading specific information from a bar code reader of the above-described sample holder after soaking a sample in a crystalline sponge.
Figures 14A, 14B:
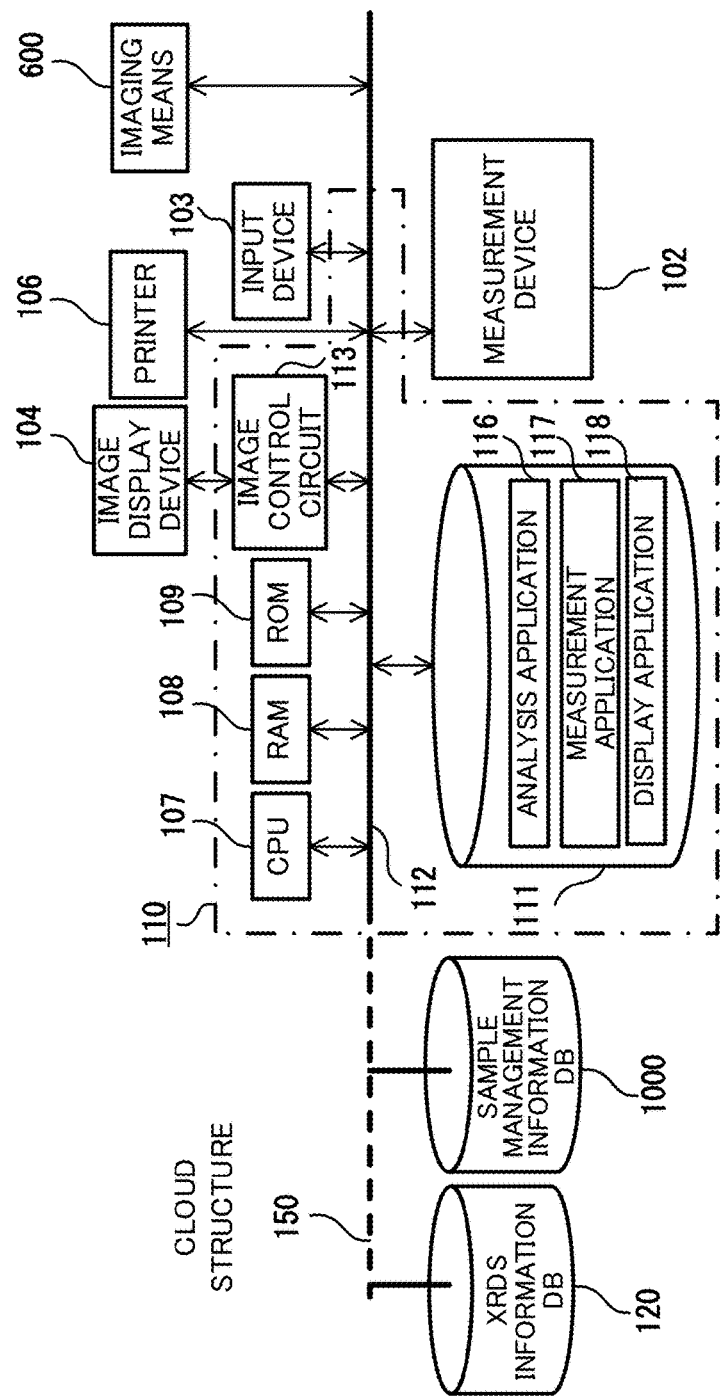
FIG. 14 is a diagram in which in addition to a configuration of a single-crystal X-ray structure analysis apparatus, that comprises means for imaging the above-described specific information and a sample management information database for managing it; one example of a data structure thereof is shown.

As described above, the sample holder 250 with which soaking a sample in the crystalline sponge 200 combinedly attached to beforehand is completed is subsequently removed from the applicator 300, and is attached to the goniometer head 121 at the tip of the goniometer 12. At this time, as shown in FIG. 13 as well, for example, the bar code 220 as information held by the sample holder (or the applicator 300) is read by a bar code reader or the like, that is, imaging means 600; and this information is subsequently used as inherently specific information about the sample in structure analysis. In addition, as also shown in FIG. 14A, the imaging means 600 is added and provided in constituent requirements of the single-crystal X-ray structure analysis apparatus 1, that have already been shown in the above-described FIG. 3 as well.

The bar code 220 data obtained by this imaging means 600 is each stored as the sample inherent number/symbol data inside the so-called sample management information DB 1000 (Refer to FIG. 14A) similarly added and provided in the existing constituent requirements in more detail. At that time, the sample inherent number/symbol for specifying the crystalline sponge 200 may include a manufacturer, a site of manufacture, a date of manufacture and a lot number and so forth of the crystalline sponge 200, and may further include support information for indicating a billing state of the crystalline sponge. In addition, information for indicating a type of the crystalline sponge 200 (for liquid, a gaseous body or the like) may be included. Then, as shown in FIG. 14B, these pieces of information are recorded as invariable information, and are also utilized as search information for associating the measured sample therewith to specify it in every kind of automatic structure analysis processing and so forth with a subsequent measurement application software. The invariable information means information determined in a step before soaking, and the variable information means information obtained in a step after soaking.

In addition, according to the above-described explanation, it is described that acquisition of the sample inherent number/symbol data via the bar code 220 is carried out when the sample holder 250 is attached to the goniometer head 121 at the tip of the goniometer 12, but the present invention is not limited thereto, for example, it would be obvious to one of ordinary skill in the art that it may be carried out at a point of time when the sample is irradiated with X-rays from the X-ray tube 11, in the single-crystal X-ray structure analysis apparatus 1; or may be carried out before the point of time.

Further, a displayable data amount becomes one limited by the bar code 220, and thus a part of the above-described invariable information is only displayed, and necessary other information is previously stored in other storage means (for example, sample management information DB 1000, a portable recording medium such as USB, or the like) and is provided, and may be made to be searchable by display data via the bar code 220.

On the other hand, in addition to the above-described invariable information, the processing before measurement by a structure analysis apparatus, for example, presence/absence of using a soaking device (soaking machine); conditions of parameters (pressure, a sample amount, a solvent and so forth) in the soaking step, results thereof, and so forth; and further, measurement data (Refer to the above-described FIG. 3B) of an XRDS pattern, an image or the like actually measured after the measurement, and so forth are stored as information recorded by actual measurement, that is, variable/recording information. Thereafter, these pieces of information are also utilized as actually measured sample data in every kind of subsequent automatic structure analysis processing and so forth with a measurement application software.

For example, a measurement range can be determined by solvent and sample types corresponding to invariable information during measurement. Further, the conditions of repetitive measurement and high redundancy measurement can be determined by determining the number of measurements, measurement time and so forth via soaking results (soaking amounts) as variable information. Further, a center position of a crystalline sponge as a measurement object can also be determined based on "dimensional information (invariable information) of the crystalline sponge".

A target and a solvent can be exactly predicted by using information of a medium type during analysis to recognize a weak signal from the solvent. Further, the target and a solvent amount are found out by a soaking rate (amount), and thus an electron density is easily recognized. For example, a measurement condition and an analysis condition can be determined based on "inherent information about a crystalline sponge such as a structure, a composition and so forth of a crystal (invariable information)" and "information about a sample soaked in the crystalline sponge, and a solvent used during soaking (variable information)".

In addition, the invariable information comprises a type of the crystalline sponge, a manufacturer, a site of manufacture, a date of manufacture, a lot number, and support information. The variable information comprises a soaking condition, a soaking result, a measurement condition, a measurement result, or information obtained in the steps after soaking including a condition under sample preparation, a condition under soaking, a condition under measurement and results thereof.

In this manner, when inherent information attached onto a sample holder or an applicator is recorded inside sample management information DB 1000 as sample management means, and is utilized, it becomes possible to mutually associate data obtained in subsequently performed various measurement steps therewith by including the measurement conditions and so forth, and to handle it. For example, if conditions and so forth for soaking provided via a cloud structure based on the above-described inherent information is searched, it may be also possible to automatically execute the input/setting by easily acquiring necessary soaking conditions. From this, it becomes possible to unitarily manage data obtained from a subsequent processing by a structure analysis program, and it also becomes possible to construct a work environment in which whether or not a sample introduced into a sample holder is appropriate, setting of measurement conditions, and so forth can be performed in an easy and user-friendly manner, including an input operation thereof. Further, the storage, verification, and management of the sample after measurement/analysis can also be more easily carried out. In addition, it may also be possible that the sample management information DB 1000 is integrated with the XRDS information database 120 in which existing XRDS image data is stored. Further, in the above-described example, information is held in the cloud, but may be held in a memory (HDD) of the single-crystal X-ray structure analysis apparatus 1 without being necessarily limited thereto. Further, when the order of samples to be measured is predetermined, inherent information is previously stored inside the memory without constituting it to acquire the inherent information from the sample holder and is read in order, and it may be constituted to acquire the corresponding invariable information and variable information.

In this manner, when utilizing the sample holder 250 (and further, an applicator as a handling tool thereof), on a part of which inherently specific information about the sample is held, a single-crystal X-ray structure analysis apparatus capable of making handling of the sample together with the crystalline sponge be more easily user-friendly, including not only the storage, measurement and management but also the subsequent verification is to be realized via the sample management information DB 1000 for unitarily managing related measurement information with the specific information.

In addition, it is described that according to the present example, such inherent identification information is displayed by the bar code 220 attached on the part of the sample holder and/or the applicator, but the present invention is not limited only thereto, and may be one in which information for identifying the crystalline sponge 200 is displayed. For example, one obtained by utilizing calculation means and storage means(for example, a memory and so forth) of a semiconductor chip may be used in place of the above-described bar code. In addition, at the time, it may be preferred that such means is one capable of communicating the content with an external apparatus in a noncontact manner. Further, the content of information is not limited to the inherent identification information corresponding to the above-described measurement sample, and may include others such as conditions of measurement data and so forth. In addition, an example in which the bar code 220 is attached and displayed on the outer-peripheral face of the sample holder and/or the applicator is explained in those described above, but the present invention is not limited thereto, and the bar code may be displayed at the other place. In this case, specially, when the means that is communicable with an external apparatus in a noncontact manner is used, it may be preferred since a degree of freedom at the attachment place is further increased.

In addition, it may also be more effective in consideration of convenience of a user at a measurement site that information indicating a type of the crystalline sponge 200 is displayed by further using different colors (for example, red for liquid, yellow for a gaseous body, and so forth) of appearance of the sample holder and/or the applicator in addition to the above-described bar code. In this case, further, it is also possible that the information indicating the type of the crystalline sponge 200 is set to information encoded by dye dots. Then, when using a camera or the like capable of reading the dye dots as imaging means 600 described above, it also becomes possible to input the information indicating the type of the crystalline sponge 200 with the colors of appearance of the sample holder and/or the applicator.

As described above in detail, according to the present invention, the single-crystal X-ray structure analysis using a very small and fragile crystalline sponge can be quickly, surely and easily performed without accompanying the conventionally required fine and precise operation, even if not having specialized knowledge of X-ray structure analysis, in other words, it is made possible to efficiently perform the single-crystal X-ray structure analysis using the crystalline sponge with high-yield; and with an excellent versatile property, management of information (the management of information required for operations of preparation before measurement, handling, storage and management, verification and storage after the measurement, and so forth) about the sample together with the very small crystalline sponge is simultaneously facilitated including an input thereof and a subsequent search operation, that is, a user-friendly single-crystal X-ray structure analysis apparatus is realized, and further a method and a sample holder (that may include an applicator) therefor are provided. In other words, it becomes possible to make the single-crystal X-ray structure analysis with the above-described very small crystalline sponge be easily usable, and to widely spread it.

In addition, though various Examples according to the present invention are described above, the present invention is not limited to the above-described Examples and includes various modified examples. For example, the above-described Examples describe the entire system in detail in order to facilitate understanding of the present invention, but are not necessarily limited to those having all the configurations that have been described. Further, a part of a configuration of one Example may be replaced with a configuration of another Example; further, a configuration of another Example may be added to a configuration of one Example; and with respect to a part of a configuration of each Example, further performed may be addition/deletion/replacement of another configuration. Further, each of the above-described configurations, functions, processing sections, processing means and so forth may be achieved with hardware by designing a part or all of them with for example, an integrated circuit, or the like. Further, each of the above-described configurations, functions and so forth may be achieved with software by interpreting and executing a program with which a processor realizes each function. Information of a program for realizing each function, a table, a file and so forth may be possible to be placed in recording devices such as a memory, a hard disk, SSD (Solid State Drive) and so forth, or in recording media such as an IC card, a SD card, DVD and so forth.

The present invention is widely applicable for a searching method of a material structure, an X-ray structure analysis apparatus used for the same, and so forth.

In addition, the present international application claims priority under Japanese Patent Application No. 2018-218733, filed Nov. 22, 2018, and the entire content of Japanese Patent Application No. 2018-218733 is applied to the present international application.

EXPLANATION OF THE SYMBOLS

1 . . . Single-crystal X-ray structure analysis apparatus (whole), 9 . . . Single-crystal X-ray diffractometer, 11 . . . X-ray tube, 12 . . . Goniometer, 22 . . . X-ray detector, 102 . . . Measurement device, 103 . . . Input device, 104 . . . Image display device, 107 . . . CPU, 108 . . . RAM, 109 . . . ROM, 111 . . . Hard disk, 116 . . . Analysis application software, 117 . . . Measurement application software, 121 . . . Goniometer head, 250 . . . Sample holder, 200 . . . Crystalline sponge, 251 . . . Base part, 252 . . . Pin-shaped holding part, 253 . . . Fine hole, 254 . . . Sample introduction tube, 300 . . . Applicator, 301 . . . Storing space, 302 . . . Opening, 220 . . . Inherent information, Bar code, 600 . . . Imaging means, and 1000 . . . Sample management DB.

The invention claimed is:

1. A single crystal X-ray structure analysis apparatus for performing structure analysis of a substance, comprising:
    a structure analysis section that performs a structure analysis of the target material based on diffracted or scattered X-rays detected as X-rays diffracted or scattered by a target material occupying a framework in an X-ray detection measurement step; and a soaking rate or a soaking amount of the target material, which is information acquired in a step for soaking the target material,
    wherein an electron density of the target material is recognized by using a result of the structure analysis.

2. The single crystal X-ray structure analysis apparatus according to claim 1,
    wherein the framework is formed of a porous complex crystal capable soaking the target material in a plurality of micropores formed therein.

3. The single crystal X-ray structure analysis apparatus according to claim 1,
    wherein the target material comprises a sample and a solvent.

4. A method for analyzing a structure of a substance, comprising the steps of:
    acquiring information on a soaking rate or a soaking amount of a target material occupying a framework in a step for soaking the target material,
    irradiating the target material with X-rays,
    detecting and measuring X-rays diffracted or scattered by the target material,
    performing structural analysis of the target material based on the diffracted or scattered X-rays detected and measured by the X-ray detection measurement step and the information on a soaking rate or a soaking amount, and
    recognizing an electron density of the target material using a result of the structural analysis.

5. The single crystal X-ray structure analysis method according to claim 4,
    wherein the framework is formed by a porous complex crystal capable of soaking the target material in a plurality of micropores formed therein.

6. The single crystal X-ray structure analysis method according to claim 4,
    wherein the target material comprises a sample and a solvent.

* * * * *